(12) United States Patent
Jeon

(10) Patent No.: US 8,452,094 B2
(45) Date of Patent: May 28, 2013

(54) REAL-TIME IMAGE GENERATOR

(75) Inventor: Seung-Hun Jeon, Guro-gu (KR)

(73) Assignee: Dongbu HiTek, Co., Ltd., Seoul (KR)

( * ) Notice: Subject to any disclaimer, the term of this patent is extended or adjusted under 35 U.S.C. 154(b) by 679 days.

(21) Appl. No.: 12/647,501

(22) Filed: Dec. 27, 2009

(65) Prior Publication Data

US 2010/0166301 A1    Jul. 1, 2010

(30) Foreign Application Priority Data

Dec. 31, 2008    (KR) ........................ 10-2008-0138068

(51) Int. Cl.
     *G06K 9/00*      (2006.01)

(52) U.S. Cl.
     USPC ........................................ 382/169; 382/162

(58) Field of Classification Search
     USPC ................................. 382/162–169
     See application file for complete search history.

(56) References Cited

U.S. PATENT DOCUMENTS

| | | | | |
|---|---|---|---|---|
| 4,424,589 A | * | 1/1984 | Thomas et al. ............... | 382/317 |
| 5,784,180 A | * | 7/1998 | Sakai et al. ................... | 358/501 |
| 6,778,691 B1 | * | 8/2004 | Barski et al. .................. | 382/132 |
| 7,136,073 B2 | * | 11/2006 | Newman ....................... | 345/589 |
| 7,596,266 B2 | * | 9/2009 | Maxwell et al. ............... | 382/167 |
| 7,791,652 B2 | * | 9/2010 | Mitsunaga ..................... | 348/239 |
| 2001/0043258 A1 | * | 11/2001 | Ohki ............................. | 347/115 |
| 2001/0045957 A1 | * | 11/2001 | Ulichney ....................... | 345/596 |
| 2003/0128381 A1 | * | 7/2003 | Zaima ............................ | 358/1.9 |
| 2008/0118105 A1 | * | 5/2008 | Friedhoff et al. ............. | 382/103 |
| 2009/0015683 A1 | * | 1/2009 | Ando .......................... | 348/222.1 |
| 2009/0079753 A1 | * | 3/2009 | Alessi et al. .................. | 345/589 |
| 2009/0310015 A1 | * | 12/2009 | El-Mahdy et al. ............ | 348/441 |
| 2010/0195901 A1 | * | 8/2010 | Andrus et al. ................ | 382/162 |
| 2011/0064308 A1 | * | 3/2011 | Stein et al. .................... | 382/170 |
| 2011/0075918 A1 | * | 3/2011 | Friedhoff et al. ............. | 382/159 |

\* cited by examiner

Primary Examiner — Jingge Wu
(74) Attorney, Agent, or Firm — Sherr & Jiang, PLLC

(57) ABSTRACT

A real-time image generator is disclosed. A real-time image generator may include a first block extracting only a luminance component having a saturation, hue, and value domain from red, green and blue values of an image. A second block outputs a log summation value and pixel count value with respect to a luminance component of an overall image by using the extracted luminance component and a natural log value. A third block calculates a luminance average value of the image by using the natural log summation value and the pixel count value outputted in the second block, the third block generating a tone mapping look up table including a tone mapping operator ($L_d$) for each luminance range to obtain a final output image using the calculated luminance average value. The third block outputs a tone mapped red, green and blue value by multiplying a corresponding tone mapping operator ($L_d$) of the tone mapping look up table by a red, green and blue value of the input image.

18 Claims, 4 Drawing Sheets

LUT of log(x)

WDR Local Tone Mapping

REAL-TIME IMAGE GENERATOR

The present application claims priority under 35 U.S.C. 119 to Korean Patent Application No. 10-2008-0138068 (filed on Dec. 31, 2008), which is hereby incorporated by reference in its entirety.

BACKGROUND

Wide dynamic range (WDR) image generators in the related art may be categorized into TRC types and TMO (Tone Mapping Operation) types. A TRC type calculates a proper tone curve of images, and performs tone-mapping based on the proper tone curve. A TMO type performs tone-mapping by using an operator calculating a luminance component proper to each pixel based on pre-calculated statistics of images.

The TRC type has a fast calculation time and a fast task completion time, with deteriorating performance. In contrast, the TMO type has better performance, but with a relatively long calculation time and a relatively slow task completion time.

A structure of a WDR image generator embodying such the TMO type tone mapping is shown in FIG. 1. FIG. 1 is a block diagram illustrating a related WDR image generator. A color space transfer to RGB block 1 shown in FIG. 1 transfers RGB (Red, Green and Blue) information of an input image into YCbCr color space having a brightness component (Y) and a chrominance component (C). Here, a mathematical formula of the luminance gain component (Y) is as follows:

$$L_w = 0.2654 * R_W + 0.6704 * G_W + 0.0642 * B_W \qquad \text{FORMULA 1}$$

A scene luminance calculation block 2 outputs only the luminance component $L_w(i, j \text{ and } t_k)$ in the YCbCr color space transferred from the color space transfer to RGB 1. A log-average luminance calculation block 5 calculates the luminance sum of the image by using an output cumulative value of the scene luminance calculation 2 and a natural log. This calculation is as follows:

$$L_{avg} = \exp\left(\frac{\sum \log(\delta + L_w)}{N}\right) \qquad \text{FORMULA 2}$$

The log-average luminance calculation 5 calculates an average value ($L_{avg}(t_k-1)$) of the luminance components of the images by using above Formula 1 and Formula 2 and it induces $L_s$ of a next image by using a linear scaling parameter 'α' as follows:

$$L_s(i, j, t_k) = \frac{\alpha}{L_{avg}(t_{k-1})} * L_w(i, j, t_k) \qquad \text{FORMULA 3}$$

$L_d$ that is an operator applicable to the image is induced as shown in following Formula 4 by using $L_s$ induced from Formula 3.

$$L_d = \frac{L_s(i, j, t_k) * \left(1.0 + \frac{L_s(i, j, t_k)}{L_{white}^2(t_{k-1})}\right)}{1.0 + L_s(i, j, t_k)} \qquad \text{FORMULA 4}$$

The operator $L_d$ gained from Formula 4 is applied to a color image $C_w$ input from following Formula 5 and a final output image $C_d$ is gained. Here, $C_d$ is referenced to as $R_d$, $G_d$ and $B_d$.

$$C_d = L_d * \left(\frac{C_w}{L_w}\right)^\gamma \qquad \text{FORMULA 5}$$

In this way, the related WDR image generator performs a log operation with respect to the natural log and the exponential function. Because of that, the related WDR image generator has a relatively large load for performing real-time both of processing another image, the natural log operation, and the exponential function. In addition, WDR image generator is difficult to synchronize with the other blocks.

Furthermore, the related WDR image generator has to perform above Formula 3 to Formula 5 whenever each of the pixels is inputted in the blocks. Because of that, the related WDR image generator has to perform 4 division log operations that require the largest space and much time. As a result, the related WDR image generator is not appropriate for a high resolution image higher than 8 mega pixel level that requires a high speed clock.

Still further, the related WDR image generator uses the color space transfer calculation for performing the real-time image process as shown in Formula 1 and it would cause color distortion of the image because of correlation between the color component and the luminance component in the actual image. To prevent such color distortion, operators making proper computational adjustments may be required to correct color distortion, such as Formula 3 to Formula 5. In addition, flexibility of the image processing algorithm would deteriorate because the tuning point (γ) of Formula 5 is added.

SUMMARY

Embodiments relate to image processing technology, more particularly, to a real-time wide dynamic range (WDR) image generator. Embodiments relate to a real-time image generator for real-time high speed image processing used in processing a high resolution image. Embodiments relate to a real-time image generator enabling real-time image processing even when other functions for processing images are performed.

Embodiments relate to a real-time image generator may include a first block extracting only a luminance component having a saturation, hue, and value domain from red, green and blue values of an image. A second block outputs a log summation value and pixel count value with respect to a luminance component of an overall image by using the extracted luminance component and a natural log value. A third block calculates a luminance average value of the image by using the natural log summation value and the pixel count value outputted in the second block, the third block generating a tone mapping look up table including a tone mapping operator ($L_d$) for each luminance range to obtain a final output image using the calculated luminance average value. The third block outputs a tone mapped red, green and blue value by multiplying a corresponding tone mapping operator ($L_d$) of the tone mapping look up table by a red, green and blue value of the input image.

DRAWINGS

DESCRIPTION

Figure 1:
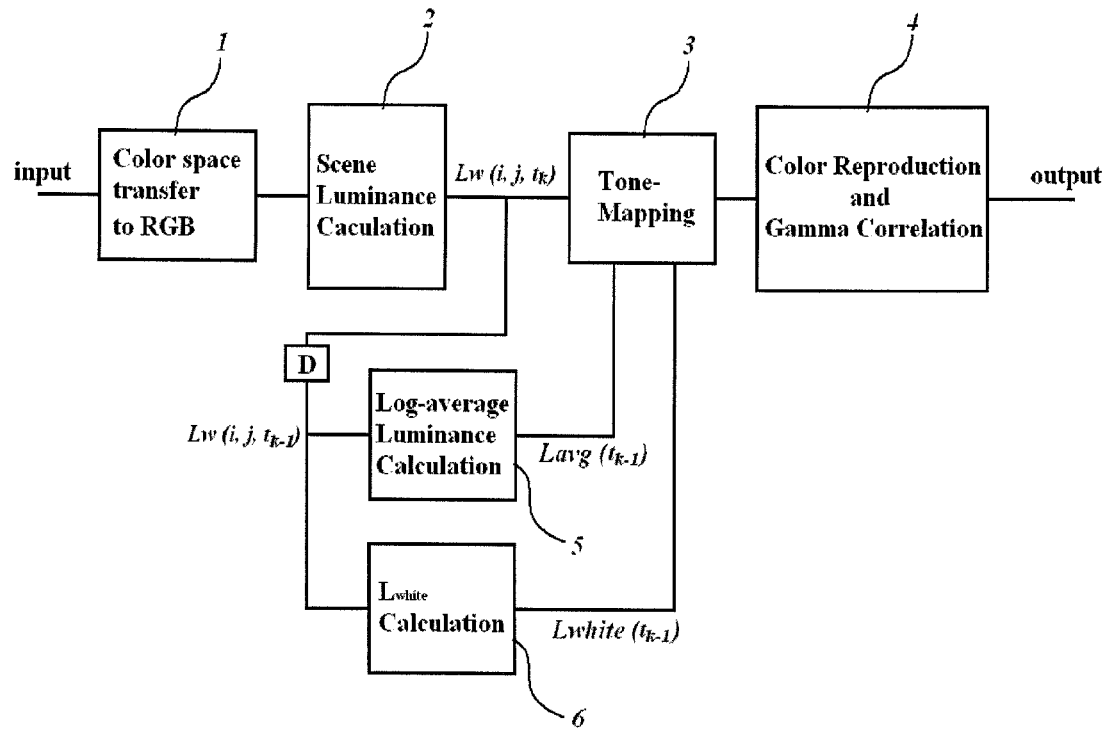
FIG. 1 is a block diagram illustrating a structure of a related WDR image generator.
Figure 2:
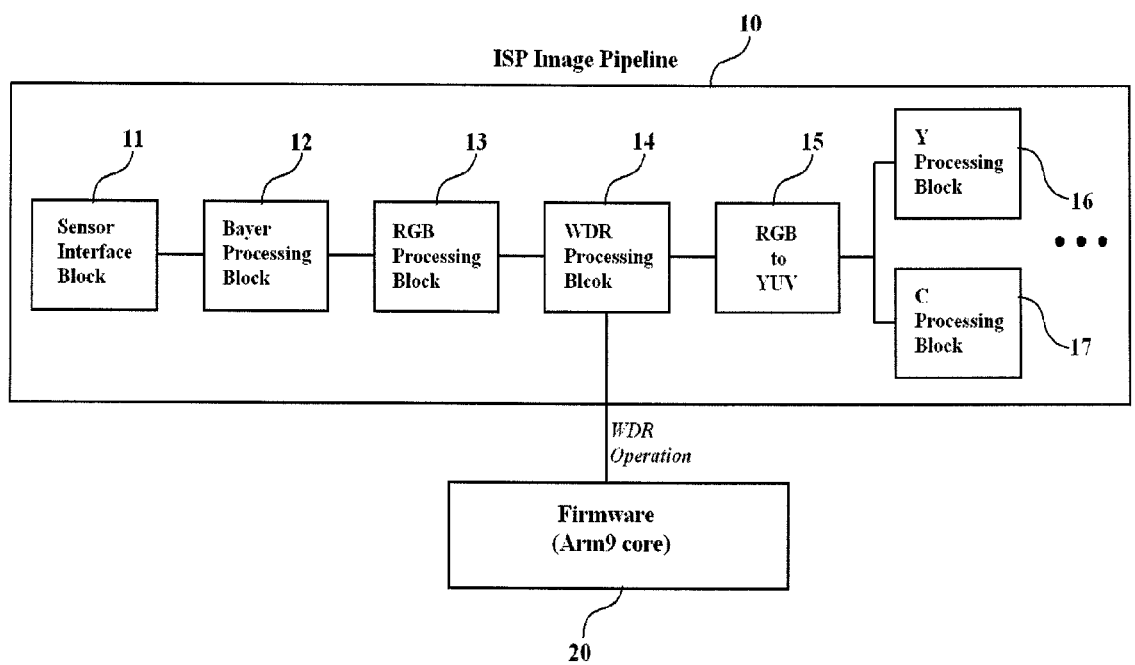
FIG. 2 is a block diagram illustrating an image pipeline for image processing.

A real-time image generator according to embodiments will be described below with reference to the accompanying drawings. FIG. 2 is a block diagram illustrating an image pipeline for image processing. A WDR image processing function of the image pipeline 2 shown in FIG. 2 may include a process of calculating an operator of each pixel in a TMO type tone mapping function. A natural log and an exponential function may be simplified to be processed real-time without effect to the other functions in the image processing.

As shown in FIG. 2, a WDR processing block 14 may be provided in a RGB processing block 13. An RGB to YUV processing block 15 and WDR processing may be performed before color space transfer from RGB to YUV. RGB data may be inputted in the WDR processing block 14 and RGB data is outputted.

As shown in FIG. 2, the image pipeline 10 may be configured to output an input image in real-time. Blocks of the image pipeline 10 according to embodiments may have an auxiliary structure of a firmware block 20. Here, the firmware block may use, for example, a high performance Arm9 series core.

A sensor interface block 11, a Bayer processing block, Y processing block 16 and C processing block 17 shown in FIG. 2 are a known configuration of the image pipeline 10 and detailed description thereof will be omitted accordingly.

The WDR processing block 14 provided between the RGB processing block 13 and the RGB to YUV processing block 15 may be in communication with the firmware block 20. The WDR processing block 14 shown in FIG. 2 may include a global tone mapping block and a local tone mapping block.

Figure 3:
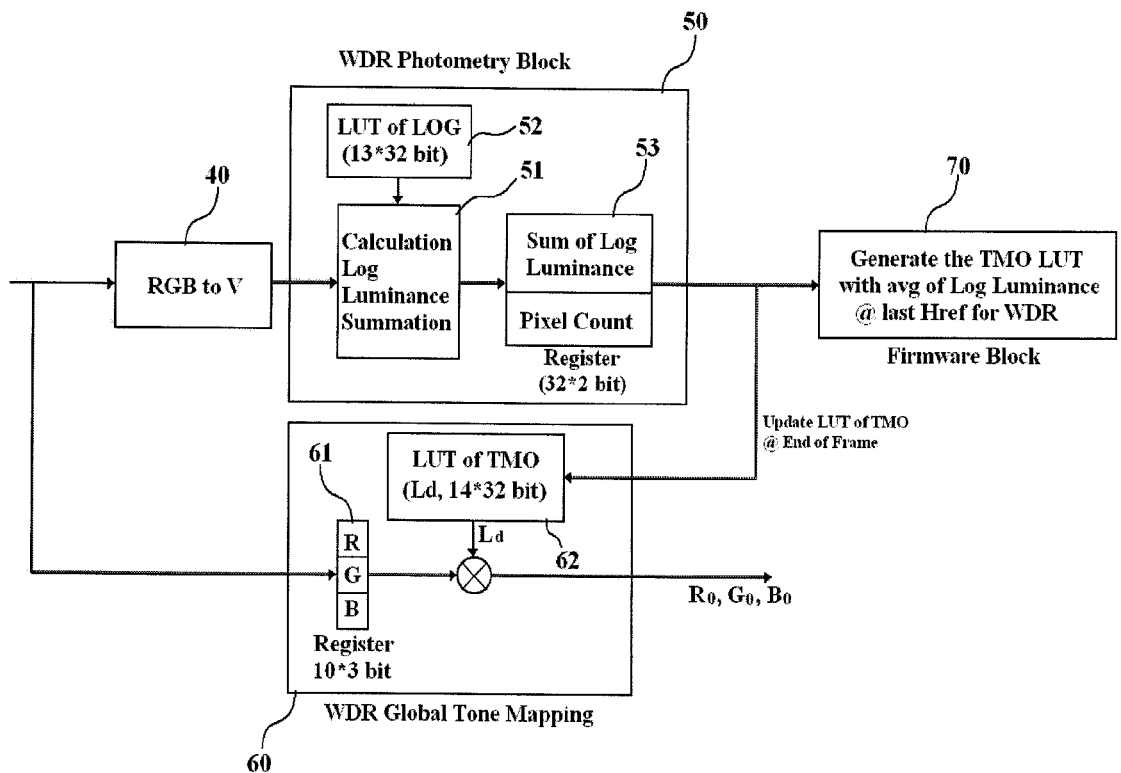
FIG. 3 is a block diagram illustrating a global tone mapping block of a WDR processing block.

FIG. 3 is a block diagram illustrating the global tone mapping block included in the WDR processing block. As shown in FIG. 3, the global tone mapping block may include a WDR photometry block 50 and a WDR global tone mapping block 60.

First of all, according to embodiments, only a luminance component (V) of HSV domain from a RGB value of an image may be used. Because of that, only the luminance component (V) may be extracted from the RGB value of the image in a RGB to V block 40, except H and S components that are color components. The output of the RGB to V block 40 may be inputted in the RDR photometry block 50.

The WDR photometry block 50 may calculate a natural log average value of the image, to perform a global tone mapping of a next image frame, and it outputs the natural log average value to the WDR global tone mapping block 60. That is, if a current image frame is the $n^{th}$ image frame, the natural log average value gained in the RDR photometry block 50 may be used to generate a TMO look up table (LUT of TMO) 62 of the WDR global tone mapping block 60 which will be used in $(n+1)^{th}$ image frame. Specifically, a calculation log luminance summation block 51 calculates a log sum of the luminance component outputted in the RGB to V 40 by using the natural log in the log look up table (LUT of LOG) 52.

As shown in FIG. 3, the output of the calculation log luminance summation block 51 may be written in a register 53, together with a pixel count value of the processed image. Here, the output of the calculation log luminance summation 51 and the pixel count value may be written in the register 53 in the last pulse of a single period of a reference pulse (Href).

Two registers 53 of the WDR photometry block 50 hold 32-bit values. A value of the register 53, which may be updated at the moment when the single period final pulse of the reference pulse (Href) finishes, is used to generate the LUT of TMO 62 for each pixel count value in the actual WDR global tone mapping block 60. Here, the LUT of TMO 62 may correspond to SRAM in hardware. That is, the value of the register 53 updated in the LUT of TMO 62 of the WDR global tone mapping block 60 may be written in a Vsync invalid period and applied to the next image frame.

A process of performing computation with respect to the luminance component outputted in the RGB to V block 40 by using the natural log of the LUT of LOG 52 will be described below. In the related art, a natural log operation may be performed to obtain a natural log average value of a corresponding frame. However, according to embodiments, the LUT of LOG 52 includes 32 steps and it predicts and reads a natural log value of corresponding luminance. 13*32-bit (=416 bit) SRAM may be used in the look up table of LOG 52 used at this time.

Figure 4:
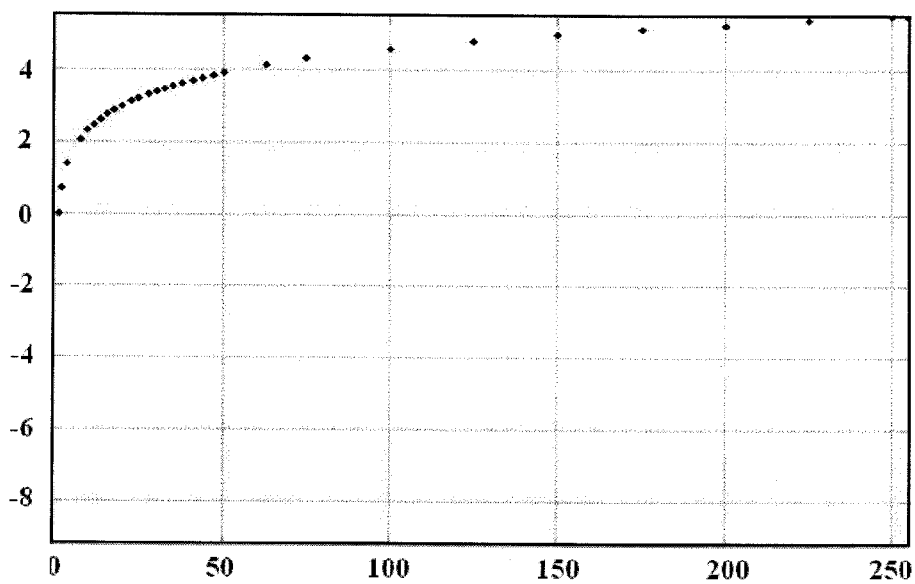
FIG. 4 is a diagram illustrating an embodiment of a look-up table of log (LUT of LOG) according to embodiments.

FIG. 4 is a diagram illustrating a configuration of the look up table of LOG (LUT of LOG) according to embodiments. If a look up table of a natural log with respect to all luminance values 0~1023 of an input image, 13*1024 bit=13299 bit=12.987 byte, will be required, this may be difficult to use.

Figure 5:
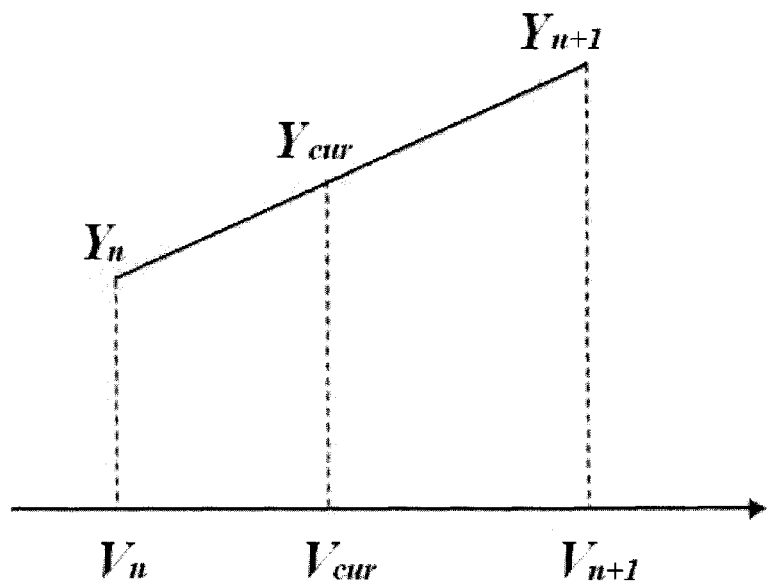
FIG. 5 is a diagram illustrating a method of a natural log for an input image in the look-up table according to embodiments.

According to embodiments, samples may be processed in 32 steps, as shown in FIG. 4, to compose the log look up table 52. A period having the input image included therein is searched and predicted. This embodiment is shown in FIG. 5. FIG. 5 is a diagram illustrating a method of applying a natural log with respect to the input image in the LUT of LOG according to embodiments.

If natural log values ($Y_n$, $Y_{cur}$, $Y_{n+1}$) for the luminance values ($V_n$, $V_{cur}$, and $V_{n+1}$) inputted in the WDR photometry block 50 are given, the relevant $Y_{cur}$ may be obtained from following Formula 6:

$$Y_{cur} = \frac{(V_{n+1} - V_{cur}) * Y_n + (V_{cur} - V_n) * Y_{n+1}}{(V_{n+1} - V_{cur}) + (V_{cur} - V_n)} \quad \text{FORMULA 6}$$

Since embodiments use the look up table in the natural log operation, logical computation may be reduced, and thus image processing speed may be improved. That is, the natural log operation for calculating the natural log value of the image in the real-time image generator is configured of the 32 step look up table and thus the logical operation used for the natural log operation is reduced, with the improved speed. Also, real-time operation is possible with not effects to the other function blocks during the image processing.

A process of generating the LUT of TMO 62 of the WDR global tone mapping block 60 by using both the output of the calculation log luminance summation block 51 and the pixel count value will be described below. After the natural log value for the input image is obtained by using the above LUT of LOG 52 and Formula 6, sum of log luminance of pixels in a region of interest (ROI) and the pixel count value are updated in the register 53. This update is performed at the moment when the last pulse of the reference pulse ($H_{ref}$) with respect to the region of interest (ROI) finishes.

An average value of input image is calculated by using two values of the registers 53 in the firmware block 20 (70 in FIG. 3) from the moment when the last pulse finishes before the Vsync invalid period finishes as shown in following Formula 7.

$$L_{avg} = \exp\left(\frac{\text{sum of log luminance}}{\text{pixel count}}\right) \quad \text{FORMULA 7}$$

After the average value ($L_{avg}$) of the image is gained, $L_d$ (TMO) is calculated for each luminance range as shown in Formula 8 only to generate the LUT of TMO 62.

$$L_{d1} = \frac{\left(L_s * \left(1 + \frac{L_s}{L_{max}^2}\right)\right)}{(1 + L_s)} \quad \text{FORMULA 8}$$

$$L_s = \frac{\alpha * V_{cur}}{L_{avg}} \quad \text{FORMULA 9}$$

To calculate $L_{d1}$, which is an operator, $L_s$ is calculated via $\alpha$, which is a linear scaling parameter as shown in Formula 9. $L_{d1}$, which is an operator applicable to the image, is calculated by using $L_s$ calculated from Formula 9.

After the operator $L_{d1}$ is generated by using above Formula 8 and Formula 9, the generated $L_{d1}$ is scaled corresponding to a bit level of the input image, for example, 8 bit or 10 bit. After that, a final operator $L_d$ is calculated as shown in following Formula 10:

$$L_d = \frac{\text{maxLuVal} * L_{d1}}{V_{cur} * \text{maxLd}} \quad \text{FORMULA 10}$$

The value 'maxLuVal' of Formula 10 is a maximum one of all luminance values 0~255 or 0~1023 of the input image. In case of an 8 bit input image, the maximum value is 255 and in case of 10 bit input image, it is 1023. The value 'maxLd' is a maximum operator which is calculated, when '$V_{cur}$=maxLuVal' is inputted in Formula 8 and Formula 9. The calculations of Formula 8 to Formula 10 may be performed with respect to a luminance range, for example, 0~255 in case of a 8 bit input image and 0~1023 in case of a 10 bit input image such that the LUT of TMO 62 is completed. The firmware block may use, for example, a high performance Arm9 series core.

The LUT of TMO 62 according to embodiments may be calculated in the firmware block 20 (70 in FIG. 3). The firmware block may use, for example, a high performance Arm9 series core. The LUT of TMO 62 may be inputted in the register corresponding to the corresponding LUT of TMO 62 in the synchronization invalid (Vsync Invalid) period before a next image frame starts. As a result, addition of hardware logic may not be required at all and the number of the logical operations may not be increased even when division calculation is used in the formulas.

Figure 6:
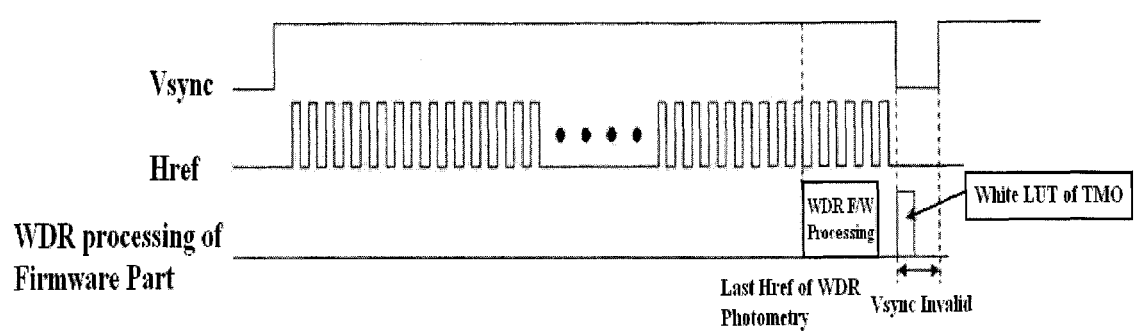
FIG. 6 is a diagram illustrating an image processing timing in a firmware block.

FIG. 6 illustrates a timing of application of the register corresponding to the LUT of TMO after the processes of above Formula 8 to Formula 10 are performed in the firmware block 10 (70 in FIG. 3). The Arm9 series firmware block 20 (70 in FIG. 3), with the relatively high core capacity, may operate at a high speed, for example, of 200 Mhz and thus the operation performance timing of the firmware block may be as shown in the timing of FIG. 6.

The global tone mapping operation will be described as follows.

If a current image frame is the $n^{th}$ image frame, the LUT of TMO 62 shown in FIG. 3 is a look up table with respect to the tone mapping operation (TMO) performed in the $(n+1)^{th}$ image frame. Multiplication operation of the operator $L_d$ by R, G and B values of the input image as shown in FIG. 3 is performed by using the $(n+1)^{th}$ obtained TMO look up table 62 in the $n^{th}$ image frame. An output RGB value ($R_o$, $G_o$ and $B_o$) is outputted as the result of the corresponding global tone mapping.

As follows, the local tone mapping block will be described. If the above global tone mapping is performed, a bright region maintains a current value and pixels of a dark region are brighter corresponding to a current camera image such that an overall contrast may be improved. However, such the global tone mapping improves the overall contrast of the image, with deteriorating a local contrast, for example, an overall hazy output image.

To improve such the local contrast, the local tone mapping for improving the local contrast should be performed after the global tone mapping according to embodiments.

Figure 7:
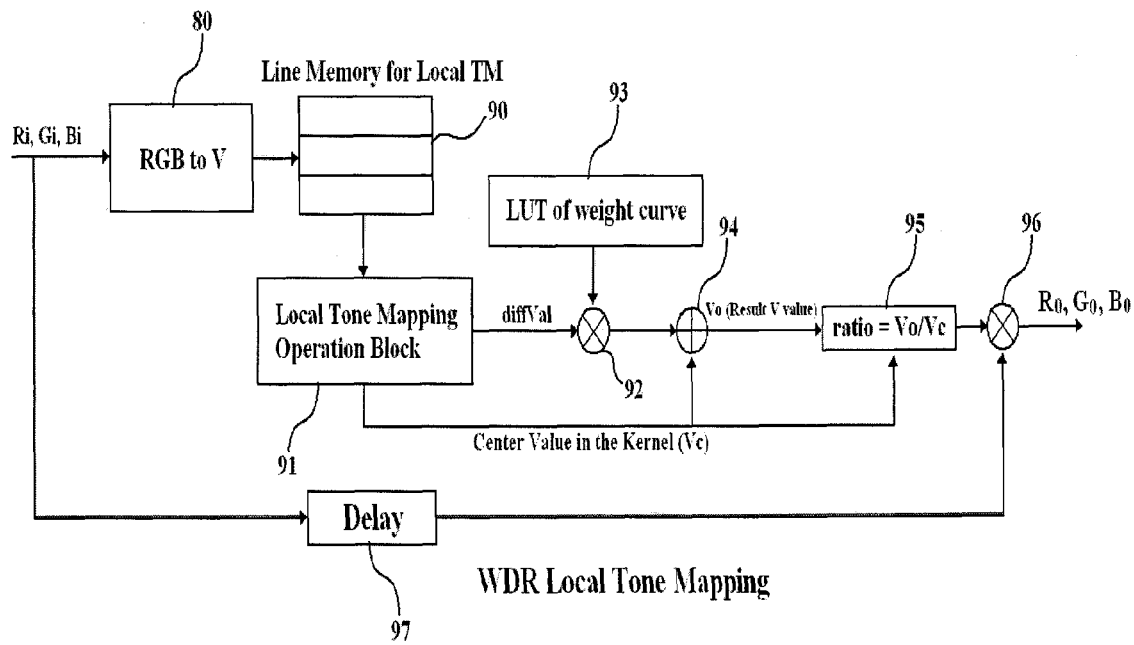
FIG. 7 is a block diagram illustrating a local tone mapping block.

FIG. 7 is a block diagram illustrating the local tone mapping block.

R, G and B values inputted in the RGB to V block 80 are $R_o$, $G_o$ and $B_o$ values gained based on the result of the global tone mapping. Currently inputted $R_i$, $G_i$ and $B_i$ values are re-transferred into luminance components in the RGB to V block 80 and the transferred luminance components are inputted in a line memory 90. hence, operation shown in following Formula 11 is performed in a local tone mapping operation block 91:

$$localAvg = \frac{\left(\begin{vmatrix} V_{11} & V_{12} & V_{13} \\ V_{21} & V_{22} & V_{23} \\ V_{31} & V_{32} & V_{33} \end{vmatrix} \cdot \begin{vmatrix} 104 & 118 & 104 \\ 118 & 134 & 118 \\ 104 & 118 & 104 \end{vmatrix}\right)}{1024} \quad \text{FORMULA 11}$$

A dot shown in FIG. 11 is a reference to a convolution operation.

After calculating a local average in a 3×3 kernel of FIG. 11, a difference value (diffVal) between a V22 that is a center value in Row 2 Column 2 of Formula 11 and the local average may be calculated.

$$\text{diffVal} = V_{22} - \text{localAvg} \quad \text{FORMULA 12}$$

To improve a local contrast of a pixel center of the currently inputted image, the difference value (dffVal) calculated from Formula 12 is added to the current pixel center value (V22) as shown in following Formula 13:

$$V_{out} = V_{22} + \text{diffVal} \quad \text{FORMULA 13}$$

That is, if the local average value is smaller than the center pixel value, an absolute value of the difference values (diffVal) is added to the center value (V22) to increase the local average value correspondingly. If the local average value is larger than the center pixel value, the absolute value of the difference values (diffVal) is subtracted from the center pixel value (V22) to heighten contrast in the local region.

Such the local tone mapping makes up for the characteristic of overall image contrast deterioration caused by the global tone mapping.

The result of the local tone mapping may be gained from above Formula 13 and here the local contrast is emphasized too much in case the difference value (diffVal) is used as it is, such that the image may look awkward. Because of that, above Formula 13 may be converted like following Formula 14 to use:

$$V_{out} = V_{22} + \text{weight}(V_{22}) * \text{diffVal} \quad \text{FORMULA 14}$$

Figure 8:
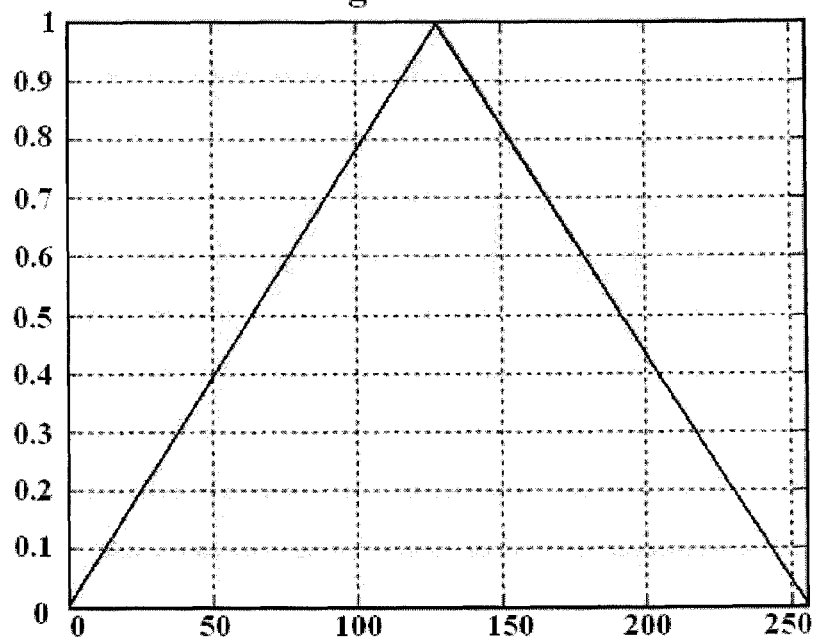
FIG. 8 is a diagram illustrating a triangle-shaped function for reducing logic computation applied to the local tone mapping.

The 'Weight' of Formula 14 may be calculated by using a triangle-shaped function simply shown in FIG. 8 to reduce logical operations. FIG. 8 is a diagram illustrating the triangle-shaped function applicable to the local tone mapping to reduce logical operations.

The weight look up table 93 using the triangle-shaped function shown in FIG. 8 is configured to perform an operation of multiplying a corresponding weight value to the difference value (diffVal) outputted from the local tone mapping operation block 91. For that multiplication operation, a multiplier 92 may be provided and a center value (Vc), for example, V22 may be added to the output of the multiplier 92. Here, for this addition, an adder 94 may be further provided.

After calculating a rate of the input to the output, input images ($R_i$, $G_i$ and $G_j$) having passed a delayer 97 may be multiplied by the calculated rate to calculate the final outputs ($R_o$, $G_o$ and $B_o$) as shown in Formula 15. The input for calculating the rate is $V_{out}$ (=$V_o$) calculated from Formula 14 and the output is the center value ($V_c$).

$$R_o = R_i * \text{ratio}$$

$$G_o = G_i * \text{ratio}$$

$$B_o = B_i * \text{ratio} \quad \text{FORMULA 15}$$

Here, the ratio is $V_o/V_c$ that is the center value divided by the output ($V_o$) of the adder 94.

According to embodiments, there are following effects.

In embodiments, the log look up table may be configured instead of using a natural log operation. As a result, logical operations may be reduced and the image processing speed may be improved accordingly. That is, the 32 stepped log look up table according to embodiments will replace the natural log operation for calculating the log average value according to the related real-time image generator, such that the logical operations used to represent the natural log operation may be reduced. As a result, the image processing speed may be improved enough to enable real-time image processing without any influence on the other function blocks.

Furthermore, complexity of the related TMO type logical operation may be improved and thus the image processing speed may be improved. That is, in the WDR algorithm based on the related art TMO, the tone mapping operator for every pixel has to be calculated. Because of that, the usage of the division operation requiring many logical operations would be increased and the other operation logic may be required for every pixel. As a result, the TPM type logical operation in the related art has a disadvantage of decreased overall operational speed. Since the clock rate is not high in an image having the low resolution, for example, under SVGA level that is less 800×600, there is no problem. However, in a digital still image camera having higher than a 8 mega pixel resolution, a high clock rate is required. The WDR algorithm based on the related tone mapping operations is not proper to this case. However, according to embodiments, the tone mapping operation requiring many operations may be transferred to a look-up table, and the look up table of the required tone mapping operation may be generated one time in a single frame.

Still further, only the HSV domain luminance components are used from the RGB values of the image according to embodiments. As a result, color distortion may not occur. That is, the color components may be also used in the luminance component calculation as shown in Formula 1 according to the related art image generator. Because of the interference between the luminance components and the color components, color distortion would occur. However, according to embodiments, only the HSV domain luminance components are used in embodiments. A completely orthogonal relation is formed between the SV plane that is the color related component and the V plane that is the luminance component. As a result, required operations may be transferred simply as shown in Formula 7 to Formula 10.

Still further, the input $V_i$ of the luminance related component and the output Vo of the tone mapping operation may be calculated. The ratio of the output to the input (ratio=$V_o/V_i$) may be multiplied by the input R, G and B values simply, such that the output may be identical to the output calculated by transferring the tone mapping operation in HSV domain into HSV and RGB. As a result, without using all of the three components (H, S and V) by transferring RGB into HSV, embodiments only use the transferred luminance component. In addition, the logical operations used to transfer RGB into HSV and vice versa may be reduced and, therefore the memory used may be reduced.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:
a first block extracting only a luminance component of a saturation, hue, and value domain except saturation and hue components from red, green and blue values of an image;
a second block including a log look up table having multiple stepped samples of a natural log with respect to the luminance component of the image and outputting a log summation value and pixel count value with respect to the luminance component of the image by searching and predicting a period having the image using the log look up table; and
a third block calculating a luminance average value of the image by using the natural log summation value and the pixel count value outputted in the second block, the third block generating a tone mapping look up table including a tone mapping operator ($L_d$) for each luminance range to obtain a final output image using the calculated luminance average value one time in a single image frame,
wherein the third block outputs a tone mapped red, green and blue value by multiplying a corresponding tone mapping operator ($L_d$) of the tone mapping look up table by a red, green and blue value of the input image,
wherein the tone mapping look up table includes $L_{avg}$ that is a luminance average value calculated using Formula 1

$$L_{avg} = \exp\left(\frac{\text{sum of log luminance}}{\text{pixel count}}\right),$$

and
wherein the tone mapping look up table includes $L_s$ induced by using Formula 2

$$L_s = \frac{\alpha * V_{cur}}{L_{avg}}$$

of the calculated luminance average value ($L_{avg}$), a linear scaling parameter ($\alpha$) and a luminance component of a current image ($V_{cur}$).

2. The apparatus of claim 1, wherein the second block comprises a log look up table of a natural log value for processing an image of a generated next frame using a natural log value of a current image frame.

3. The apparatus of claim 2, wherein second block includes a calculation log luminance summation block calculating a sum of natural log values with respect to the luminance components extracted from the first block.

4. The apparatus of claim 3, wherein second block includes a register for writing the output of the calculation log luminance summation block and the pixel count value.

5. The apparatus of claim 4, wherein the output of the calculation log luminance summation and the pixel count value are written in the register in a final pulse of a single period of a reference pulse.

6. The apparatus of claim 2, wherein log look up table includes natural log values having 32 stepped samples of all luminance ranges of the input image.

7. The apparatus of claim 1, wherein the tone mapping look up table includes:
an operator $L_{d1}$ applicable to a next image by using Formula 3

$$L_{d1} = \frac{\left(L_s * \left(1 + \frac{L_s}{L_{max}^2}\right)\right)}{(1 + L_s)}.$$

8. The apparatus of claim 7, wherein the tone mapping look up table includes:
a final operator $L_d$ that is calculated by using Formula 4

$$L_d = \frac{\text{max}LuVal * L_{d1}}{V_{cur} * \text{max}Ld}$$

after scaling the $L_{d1}$ to correspond to a bit level of the input image, and 'maxLuVal' of Formula 4 is a maximum luminance value of all luminance values of the input image and 'maxLd' is a maximum operator value calculated when '$V_{cur}$=maxLuVal' of Formula 2 and Formula 3 is inputted.

9. The apparatus of claim 1, further comprising:
a local tone mapping block for improving a local contrast in a pixel center with respect to the image because of the tone mapped red, green and blue values outputted from the third block.

10. The apparatus of claim 9, wherein the local tone mapping block includes a transfer block performing transfer into only luminance components from the output of the third block.

11. The apparatus of claim 10, wherein the local tone mapping block includes a line memory writing the output of the transfer block therein.

12. The apparatus claim 11, wherein the local tone mapping block includes a local tone mapping operation block calculating a difference value between a kernel center value and a local average value calculated in N*N kernels.

13. The apparatus of claim 12, wherein the local tone mapping operation block calculates the difference value between the kernel center value and the local average value by using the luminance component written in the line memory, the local tone mapping operation block adjusting contrast of the N*N region by adding the calculated difference value to the kernel center value to improve the local contrast in the pixel center.

14. The apparatus of claim 13, wherein the local tone mapping block adjusts contrast of the N*N region by adding the calculated difference value to the kernel center value to improve the local contrast in the pixel center.

15. The apparatus of claim 14, wherein if the local average value is smaller than the kernel center value, the local tone mapping operation block heightens the contrast of the N*N kernel region by using a value calculated by adding an absolute value of the difference value to the center value.

16. The apparatus of claim 15, wherein if the local average value is larger than the kernel center value, the local tone mapping operation block heightens the contrast of the N*N kernel region by using a value calculated by subtracting an absolute value of the difference value from the center value.

17. The apparatus of claim 13, wherein the local tone mapping operation block adjusts the contrast of the N*N kernel region by adding a value calculated by multiplying the difference value by a predetermined weight value to the kernel center value.

18. The apparatus of claim 1, wherein the final output image is generated in real-time.

* * * * *